(12) United States Patent
Zuverink

(10) Patent No.: US 7,986,322 B1
(45) Date of Patent: Jul. 26, 2011

(54) PARALLAX COMPENSATION

(75) Inventor: David Zuverink, San Jose, CA (US)

(73) Assignee: Adobe System Incorporated, Reno, NV (US)

( * ) Notice: Subject to any disclaimer, the term of this patent is extended or adjusted under 35 U.S.C. 154(b) by 1299 days.

(21) Appl. No.: 11/590,312

(22) Filed: Oct. 30, 2006

(51) Int. Cl.
*G06T 15/10* (2006.01)
(52) U.S. Cl. .................. 345/427; 345/418; 345/619
(58) Field of Classification Search .................. None
See application file for complete search history.

(56) References Cited

U.S. PATENT DOCUMENTS

| | | | | |
|---|---|---|---|---|
| 5,721,982 | A * | 2/1998 | Wakabayashi et al. | 396/148 |
| 6,459,822 | B1 * | 10/2002 | Hathaway et al. | 382/296 |
| 6,956,979 | B2 * | 10/2005 | Janakiraman et al. | 382/301 |
| 6,989,934 | B2 * | 1/2006 | Aoki et al. | 359/629 |
| 7,053,953 | B2 * | 5/2006 | Belz et al. | 348/346 |
| 7,062,723 | B2 * | 6/2006 | Smith et al. | 715/860 |
| 7,437,670 | B2 * | 10/2008 | Day et al. | 715/273 |
| 7,705,858 | B2 * | 4/2010 | Ubillos et al. | 345/619 |
| 2005/0162447 | A1 * | 7/2005 | Tigges | 345/661 |
| 2006/0146011 | A1 * | 7/2006 | Pihlaja et al. | 345/156 |

OTHER PUBLICATIONS

*Dashboard: Handy widgets at your command.*, <http://www.apple.com/macosx/features/dashboard/> (visited Feb. 6, 2007).
*TurboTax Total Tax Solution Deluxe*, ©2005 Intuit, Inc., Nov. 14, 2006.
*Acrobat 6.0 Professional: Getting A Good View*, <http://www.pctoday.com/Editiorial/article.asp?article=articles/2005/t0304/14t04/14t04.asp&guid> (visited Feb. 6, 2007).
*Full Size Image*, <http://www.pctoday.com/editorial/fullsize.asp?guid=B119CD2D9D6A48B9B7EB330286BC6C00&image=01003386.jpg&caption=Up+close+and+personal%2E+The+Loupe+tool+helps+you+view+a+specific+area+of+your+document+in+a+window+while+simultaneously+2E+You+can+also+drag+the+slider+in+the+Loupe+Tool+window+to+change+the+magnification%2E> (visited Feb. 6, 2007).
*Section Two: Navigating the Adobe Reader 7.0 Interface*, <http://www.adobe.com/enterprise/accessibility/reader/sec2_a.html> (visited Feb. 6, 2007).
Long, Ben, *Review: Apple's Aperture 1.0*, <http://www.creativepro.com/story/review/23756.html> (visited Feb. 6, 2007).
*ZoomText 9 Product Tour*, <http://www.aisquared.com/Products/zoomtexttour/index.cfm> (visited Feb. 6, 2007).
*Magnification*, <http://www.aisquared.com/Products/zoomtexttour/maglevels.cfm> (visited Feb. 6, 2007).
*Zoom Windows*, <http://www.aisquared.com/Products/zoomtexttour/zoomwindows.cfm> (visited Feb. 6, 2007).
*Reading Tools*, <http://www.aisquared.com/Products/zoomtexttour/readingtools.cfm> (visited Feb. 6, 2007).

* cited by examiner

*Primary Examiner* — Said Broome
(74) *Attorney, Agent, or Firm* — Robert C. Kowert; Meyertons, Hood, Kivlin, Kowert & Goetzel, P.C.

(57) ABSTRACT

Parallax compensation is described, including magnifying a portion of a region of a display using a lens, receiving a request to move the lens in a direction, and moving the portion relative to the lens in the direction in response to the request to move the lens to compensate for parallax at a first edge of the region.

22 Claims, 8 Drawing Sheets

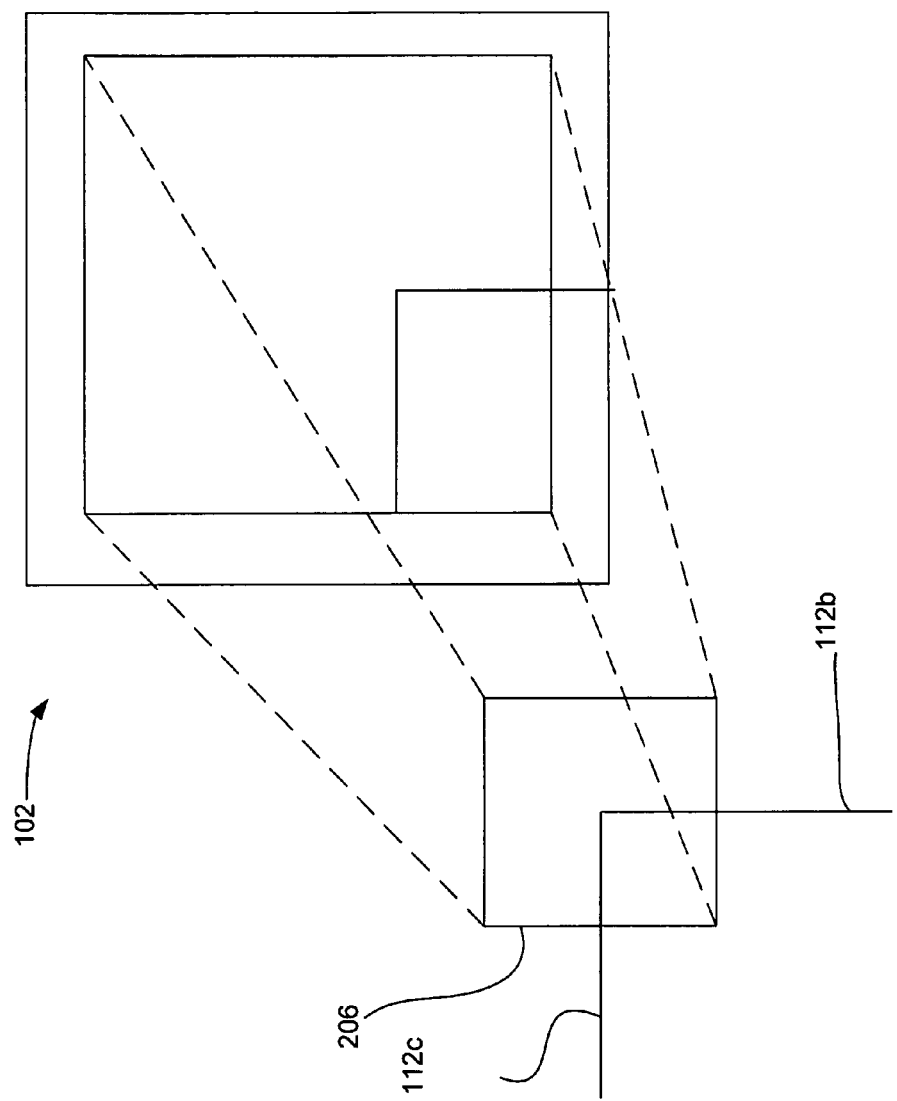

PARALLAX COMPENSATION

CROSS-REFERENCES TO RELATED APPLICATIONS

This application is related to U.S. patent application Ser. No. 11/494,180, filed on Jul. 26, 2006, and entitled "Form Filling Lens;" and is related to U.S. patent application Ser. No. 11/542,266, filed on Oct. 3, 2006, and entitled "Form Magnifier;" the disclosures of which are incorporated herein by reference.

FIELD OF THE INVENTION

The present invention relates generally to software. More specifically, parallax compensation is described.

BACKGROUND OF THE INVENTION

A magnifier is a computer program that magnifies (i.e., enlarges) areas of a display such as a computer display. Areas of a display may be magnified for various reasons. For example, the display may be magnified to assist those with low vision or to magnify a portion of the screen that has small type or images. The magnifier may be displayed on the display over the item to be magnified, and may be moved about the display by a user or by a process.

A magnifier may be used to magnify portions of a document, such as a word processing document. The document may have visible edges at its boundaries. For example, the edges may be straight lines, and may be arranged in a rectangular shape. The magnifier, when presented over the document, is centered over the portion being magnified. When the magnifier magnifies the visible edges of the document, the edges become discontinuous between the magnified portion and the unmagnified portions of the document because of parallax. Parallax may refer to apparent motion caused by differences in relative movement. In the context described here, parallax may refer to a condition where, because of the multiple points of view (e.g., the magnified portion and the unmagnified portions), the edges may become discontinuous (i.e., no longer appearing in a straight line as viewed through the magnifier). The discontinuity of the edges of the document may disorient or confuse a user of the magnifier.

Thus, what is needed is a magnifier without the limitations of conventional techniques.

BRIEF DESCRIPTION OF THE DRAWINGS

Various examples are disclosed in the following detailed description and the accompanying drawings:

FIGS. 2A-2D illustrate the magnification of various portions of a region using a lens within and near the region according to various examples;

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, parallax compensation may be applied to a lens that magnifies a portion of a region that is bounded by one or more edges. A region may be an area (e.g., a document) presented on a display that has one or more edges at its boundaries. A lens may be, for example, a program that magnifies some part (e.g., the portion) of the region. According to an example, when the lens is placed over the edges to magnify the edges, the magnified view of the edges may be subject to parallax. Parallax may be compensated by moving the portion relative to the lens using a parallax compensation factor. According to an example, parallax compensation factor may be calculated and depend on a distance between two edges, a size of the lens and a size of the portion. The compensation may be applied, for example, so that when the lens is moving, the view of the portion beneath the lens that is being magnified moves in the same direction, but at a faster rate.

Lens with Parallax Compensation

Figure 1A:
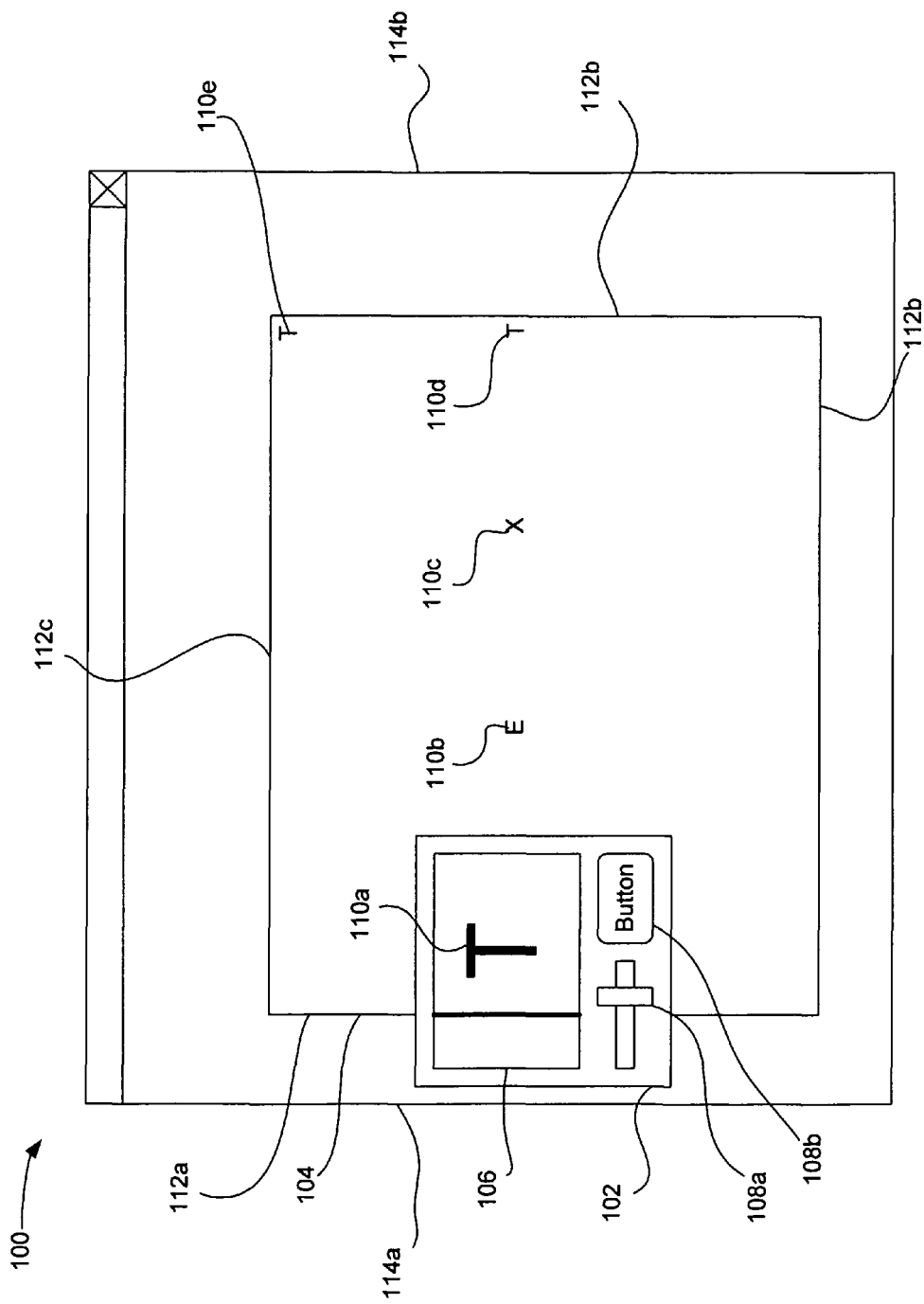
FIGS. 1A-1C illustrate a lens using parallax compensation according to various examples.
Figure 1B:
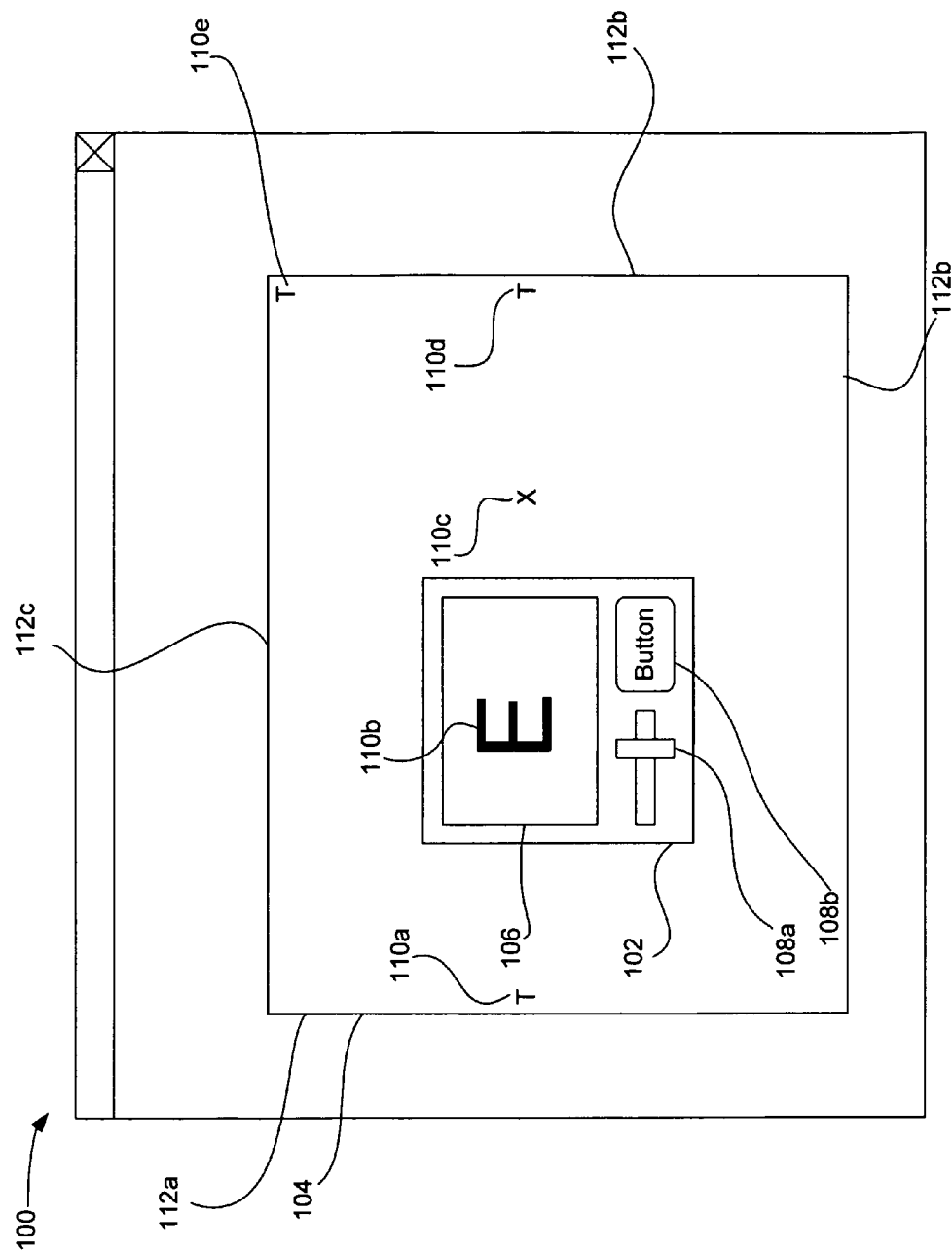
Figure 1C:
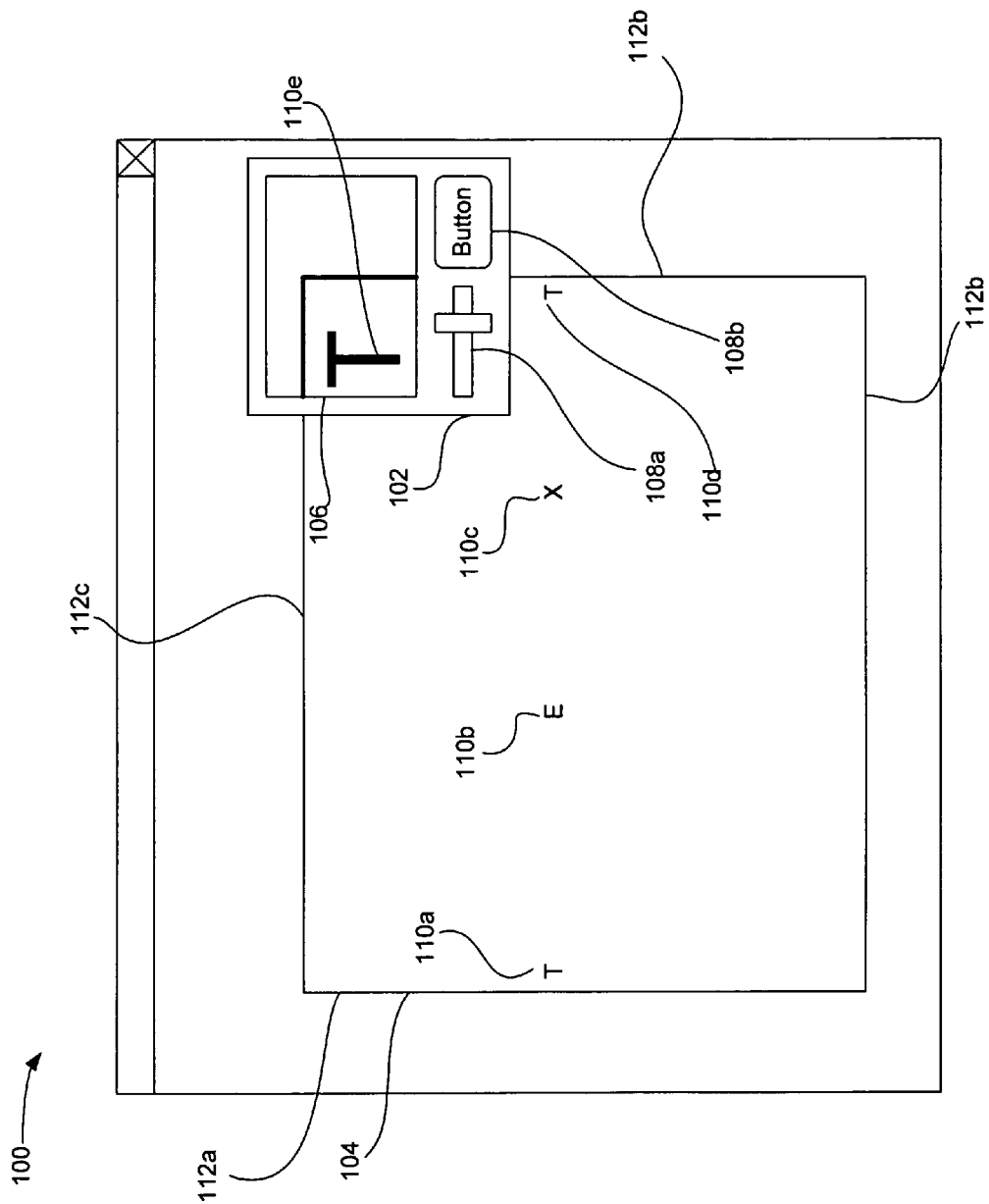

FIGS. 1A-1C illustrate a lens using parallax compensation according to various examples. The lens is positioned over different areas of a region (such as a document) to demonstrate that the magnified edges of the region are continuous (i.e., in a straight line) through the region and viewing area of the lens. The calculations for the parallax compensation are discussed regarding FIGS. 2A-2D.

FIG. 1A illustrates an application program running in a window 100 that includes a lens 102 using parallax compensation to magnify a document 104 according to various examples. The window 100 may present an application program, such as a word processor or document viewer that may be used to display or edit the document 104. Additionally, the lens 102 may be presented in any type of environment, such as a frame, desktop, or display. The lens 102 may be used with, for example, a personal computer, cellular telephone, personal digital assistant (PDA), set-top box, or television.

The lens 102 may be used to magnify a portion (see, e.g., element 206 of FIG. 2A) of the document 104, and may display that portion in a viewing area 106. The lens 102 may be a program that is an independent application, may be built into the application running in the window 100, or may be part of an operating system. The lens 102 may include various controls such as a zoom slider 108a, which allows a user to change the amount of zoom the lens uses, and a button 108b that may be used for various purposes, such as changing the area in focus of the lens 102. Additional controls may also be added or substituted. Other elements may additionally be used with the lens 102, such as an information area to display information about the document being magnified.

The lens 102, as shown in FIGS. 1A-1C, is magnifying various portions of the document 104. The lens 102 may magnify the letters 110 to demonstrate the magnification of the lens 102. The letters 110 may represent any content that may be in the document 104, such as text, images, or drawings. As shown in FIG. 1A, the lens 102 is magnifying the letter 110a.

The document 104 may be any document, such as a word processing file, a form, or an image. More generally, and for purposes of this disclosure, the document 104 is an example of a region that may be bounded by several edges 112. The edges 112 are linear and are arranged in a rectangular fashion; however, it is understood that the edges 112 may take any shape or form (e.g., circular). The edges 114 of the window 100 may also be defined, and are discussed regarding FIG. 2A.

According to an example, the document 104 may be a form that includes one or more fields. The lens 102 may be able to apply "focus" to one of these fields to select the field and present the field in the viewing area 106. A user may then be able to provide input into the field through the lens, select the next field using the button 108b, or perform other operations on the field.

According to various examples, the lens 102 may employ parallax compensation so that the edges 112 maintain an approximately continuous appearance through the lens 102. In other words, regardless of the position of the lens 102, the edges 112a and 112b appear to continue in a straight line above the lens 102, through the lens 102 and beneath the lens 102. Parallax compensation could instead or additionally be applied vertically. For example, with vertical parallax compensation applied, if the lens 102 is over the top edge 112c or the bottom edge 112d, the edges 112c and 112d also appear aligned inside the viewing area 106 and outside the lens 102. This may improve the appearance and usability of the lens 102.

As shown in FIG. 1A, the lens 102 is magnifying the left edge 112a of the document 104. The left edge 112a begins above the lens 102, continues through the lens 102, and is viewable below the lens 102. The left edge 112a appears straight and continuous through the lens 102 regardless of the position of the lens 102. In other words, if a user were to move the lens 102 in any direction and continue to keep the left edge 112a in view, the lens 102 would compensate for the parallax and the left edge 112a would continue to appear approximately straight. The compensation may be accomplished by varying the position of the magnified portion of the document 104 relative to the position of the lens 102 over the document 104. According to an example, a first and second edge may be determined (e.g., the left edge 112a and the right edge 112b), and the positional relationship between the magnified portion and the lens 102 is changed such that when the lens 102 is moved about the document 104, the edges 112 are always approximately continuous through the lens 102. The compensation may be determined by calculating a parallax compensation factor that may be used to vary the amount of movement of the portion of the region (i.e., the document) being magnified over a distance between the two edges 112a and 112b. This is explained further regarding FIGS. 2A-2C.

FIG. 1B illustrates moving the lens 102 according to an example. A user or a process may move the lens 102 to any position within or outside of the window 100. For example, the user may select the lens 102 using a pointing device, and drag the lens 102 to another position (e.g., click and drag using a mouse). As shown in FIG. 1B, the lens 102 is over a portion of the document 104 away from the edges 112, and is magnifying the letter 110b. The relationship between the portion of the document 104 being magnified and the position of the lens changes relative to the position of the lens 102 shown in FIG. 1A. For example, as is explained regarding FIGS. 2A-2C, the portion of the document 104 being magnified moves relative to the lens 102 when the lens 102 is moved. According to an example, the portion moves in the same direction as the lens 102 moves, but moves more quickly (i.e., moves further).

FIG. 1C illustrates the lens 102 over a corner of the document 104. The lens 102 is shown magnifying the letter 110e. The lens 102 may preserve the continuity of the edges 112 of the document 104 in multiple dimensions. For example, as shown here, the right edge 112b and the top edge 112c are straight and continuous through the lens 102. According to an example, the parallax compensation may be performed in two dimensions by determining the amount the lens moves in one dimension (e.g., vertically), determining the amount the lens moves in the other dimension (e.g., horizontally), and performing the compensation in both dimensions.

Cross-sectional View of the Document and Lens

FIGS. 2A-2D illustrate the magnification of various portions of a region using a lens within and near the region according to various examples. As described above, when a lens is moved within a region (e.g., a document) it is magnifying, the portion of the region that the lens magnifies moves with relation to position of the lens itself. For example, if a lens begins at the left edge of the region, and moves toward the right edge of the region, the portion being magnified shifts from underneath the left end of the lens to underneath the right end of the lens.

FIGS. 2A-2D also illustrate an alternative view of some elements described and shown in FIGS. 1A-1C. For example, the window 100, lens 102, document 104, and edges 112 are visible in the FIGS. 2A-2D. Other elements, such as the portion of the document 104 being magnified, were not visible in FIGS. 1A-1C, and may be seen in FIGS. 2A-2D.

Figure 2A:
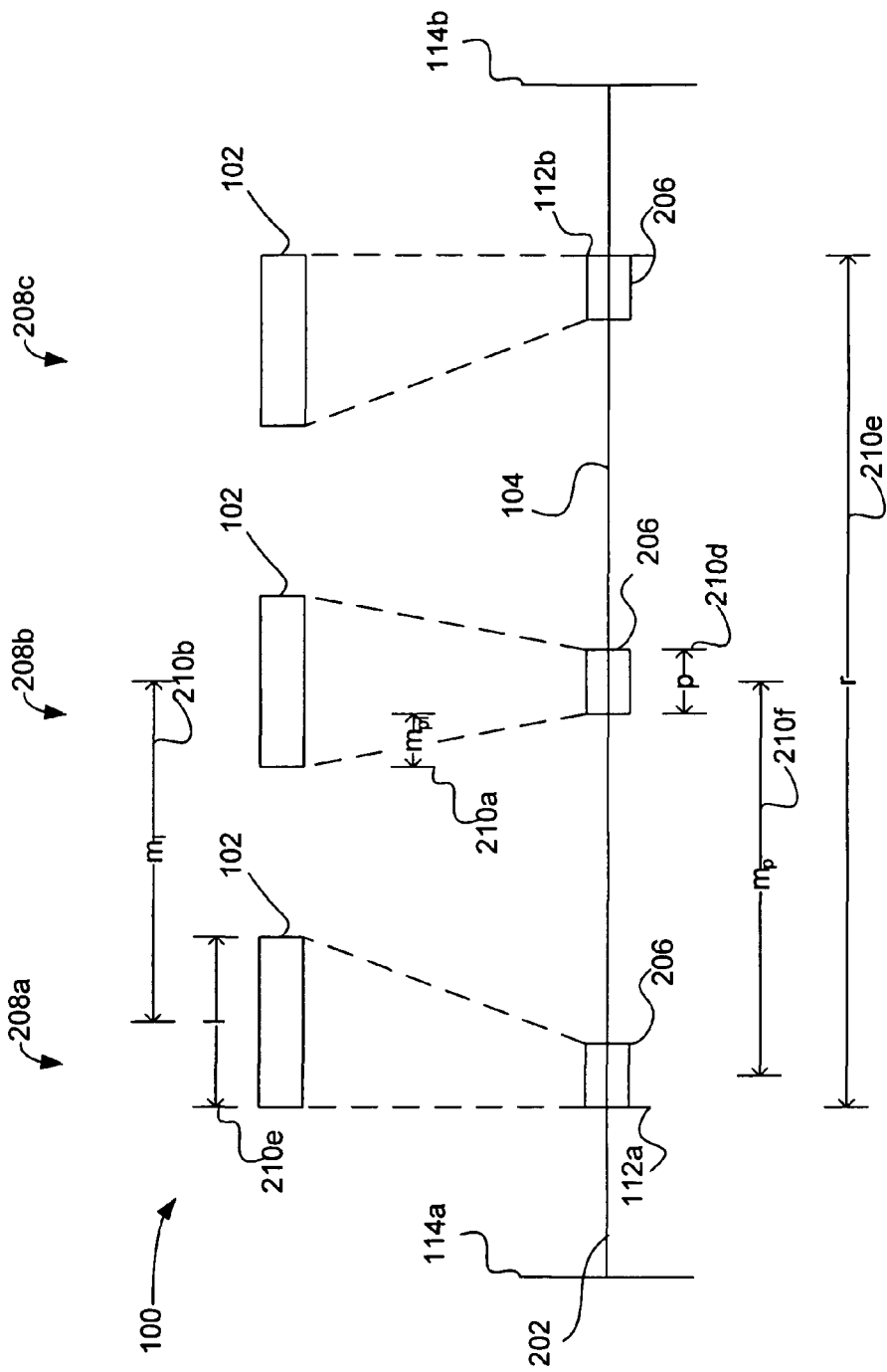

FIG. 2A illustrates a cross-sectional view of the window 100 and the document 104 with the lens 102 over the document 104. The document 104 is shown so that the surface of the document 104 is shown along the line 202 (which may represent the plane of a display); the left edge 112a of the document 104 and the right edge 112b of the document 104 are shown along the line 202. The edges 114a and 114b of the window 100 in which the document 104 is displayed are also shown. The lens 102 is shown above the document 104, and magnifies a portion 206 of the document 104. In other words, the portion 206 of the document 104 is magnified in the viewing area 106 of the lens 102. The lens 102 "floats" above the document 104 to show the relationship between the lens 102 and portion 206 of the document 104 being magnified. For example, as shown here, the lens 102 may mimic a magnifying lens, although in the program the lens 102 may be displayed directly over the document 104. The size of the lens 102, shown here, may correspond to the size of the magnification of the portion 206.

Three views of the lens 102 are shown: the views 208a, 208b, and 208c. In the view 208a, the lens 102 is at the left edge 112a of the document 104 (e.g., as shown in FIG. 1A). In the view 208b, the lens 102 is in the center of the document 104 (e.g., similar to the view in FIG. 1B). In the view 208c, the lens 102 is at the right edge 112b of the document 104 (e.g., similar to the view in FIG. 1C). In the center view 208b, the portion 206 is centered within the lens 102. In the left view 208a, the portion 206 is at the left edge of the lens 102, and in the right view 208c, the portion 206 is at the right edge of the lens 102. The views 208 may represent the lens 102 being dragged from one edge of the document 104 to another.

As shown, the portion 206 of the document 104 being magnified may move "faster" than the lens 102, which is moving from the left edge 112a to the right edge 112b. The lens 102 and the portion 206 may move in the same direction, according to an example. In the frame of reference of the lens 102, the portion 206 is moving in the same direction that the lens is moving. This movement compensates for the parallax of the lens 102 and allows the edges 112 to be continuous through the lens 102 as shown in FIGS. 1A and 1C.

The parallax correction may be performed by defining the left edge 112a and the right edge 112b. The edges 112 may be defined using one of several techniques. For example, the 112 edges may be defined by examining metadata of the document 104, or by querying the application running in the window 100 to determine the location of the edges 112. According to another example, recognition software may be used to find the edges 112 of the document 104. For example, the software may be able to detect areas of a document displayed on a screen, in a way similar to the function of optical character recognition software. The software may then find the edges of the document for the purpose of determining parallax compensation. As a result, the lens 102 may be used with any document having at least one edge. Also, edges may not be visible according to some examples.

Next, in the intermediate positions between the edges (e.g., at the center position 208b), the lens 102 may use a smooth positional animation to shift the portion 210 relative to the lens 102. For example, the "motion tween" function of Flash® by Adobe Systems Incorporated of San Jose, Calif., may be used to provide the proper animation of the lens 102 view. The motion tween function may take key frame positions as input and generate intermediate frames. Using the shape tweening function, a frame of the lens 102 at the left edge 112a (e.g., the view 208a) may be given as the first key frame, and a frame of the lens 102 at the right edge 112b (e.g., the view 208c) may be given as the last key frame. The transformed intermediate frames can then be calculated using the function.

Another technique for determining the amount of compensation (i.e., a parallax compensation factor) at a position within the document may use the following equation (1):

$$m_{pl} = \left(\frac{l-p}{r-l}\right)m_l$$

Where $m_{pl}$ (e.g., a distance 210a) is the movement of the portion 206 relative to the lens 102, $m_l$ (e.g., a distance 210b) is the movement of the lens 102 from a starting point, l (e.g., a dimension 210c) is a dimension of the lens 102 (e.g., the width of the lens 102), p (e.g., a dimension 210d) is a dimension of the portion 206 (e.g., the width of the portion 206), and r (e.g., a dimension 210e) is a dimension of the region bounded by the edges 112 (e.g., the width of the document 104). The equation (1) may be used to determine the movement of the portion 206 relative to the lens 102 when the lens moves over a distance $m_l$ 210b. An equation (2), below:

$$m_p = \left(\frac{l-p}{r-l} + 1\right)m_l$$

may be used to determine the total amount of movement of the portion 206, where $m_p$ (e.g., a distance 2100 is the distance the portion 206 moves in total. For example, using equation (1) determines the distance 210a when the lens 102 is moved from the view 208a to the view 208b. Using the equation (2) determines the distance 210f when the lens is moved from the view 208a to the view 208b.

The equations (1) and (2) may also be used to determine multi-dimensional motion of the lens 102. For example, if the lens 102 moves up and to the right in the document 104 (e.g., from the position shown in FIG. 1B to the position shown in FIG. 1C), the movement may be deconstructed into both horizontal and vertical movement. The compensation may then be applied in both the horizontal and vertical directions.

Additionally, a parallax compensation factor may be determined using a single edge. The parallax compensation factor in the single edge case may be determined using the equations (1) and (2) with the edge of the display as one of the edges, or the compensation factor may be determined based on empirical observation. Further, a single-edge compensation factor may be determined iteratively by observing the position of an edge within the lens 102 and comparing it with the position of the edge outside of the lens 102. If the edge is no longer continuous through the lens 102, the portion 206 may be adjusted accordingly. Additionally, other equations may be determined for the single-edge case.

The equations (1) and (2) assume that the portion 206 moves at a constant rate relative to the lens 102. Various modifications may be made to equations (1) and (2), including changing the amount of movement of the portion 206 in between the edges 112 (for example, to a non-linear amount), and changing the location of the edges for the purpose of the compensation when the lens 102 moves outside of the edges 112, as discussed in connection with FIGS. 2B and 2C. It is further understood that the equations (1) and (2) are examples of equations that may be used to provide a parallax compensation factor. Various other equations may be created for calculating the factor.

According to another embodiment, the lens 102 may be resized, either by a user or some other process. Resizing the lens 102 may change the amount of compensation as may be reflected in the equations (1) and (2). Additionally, if the lens 102 is large enough so that both edges in a dimension are shown within the lens 102, the compensation may not be applied.

Figure 2B:
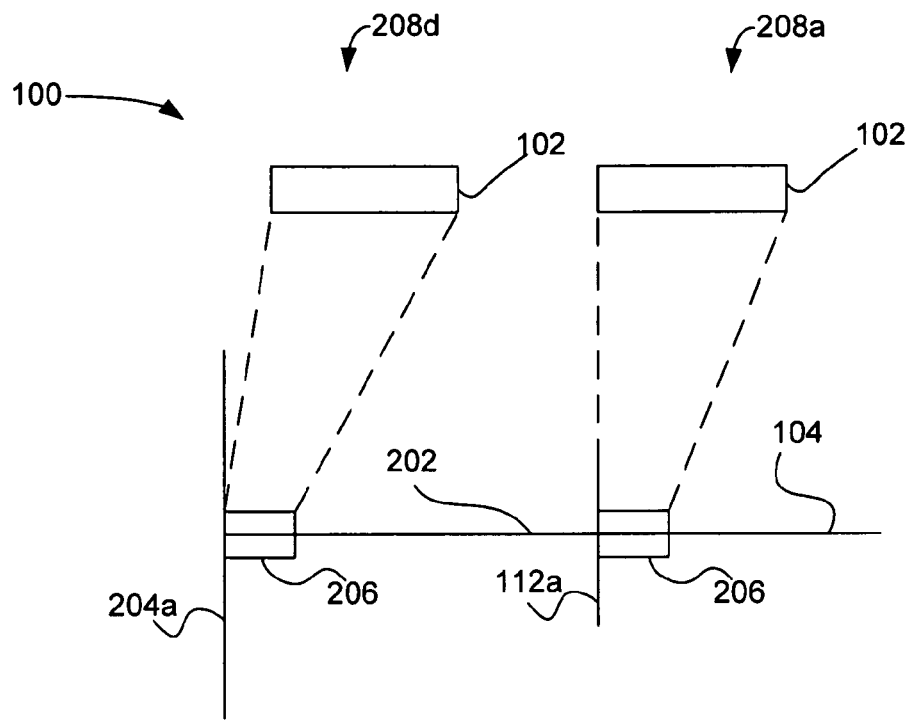
Figure 2C:
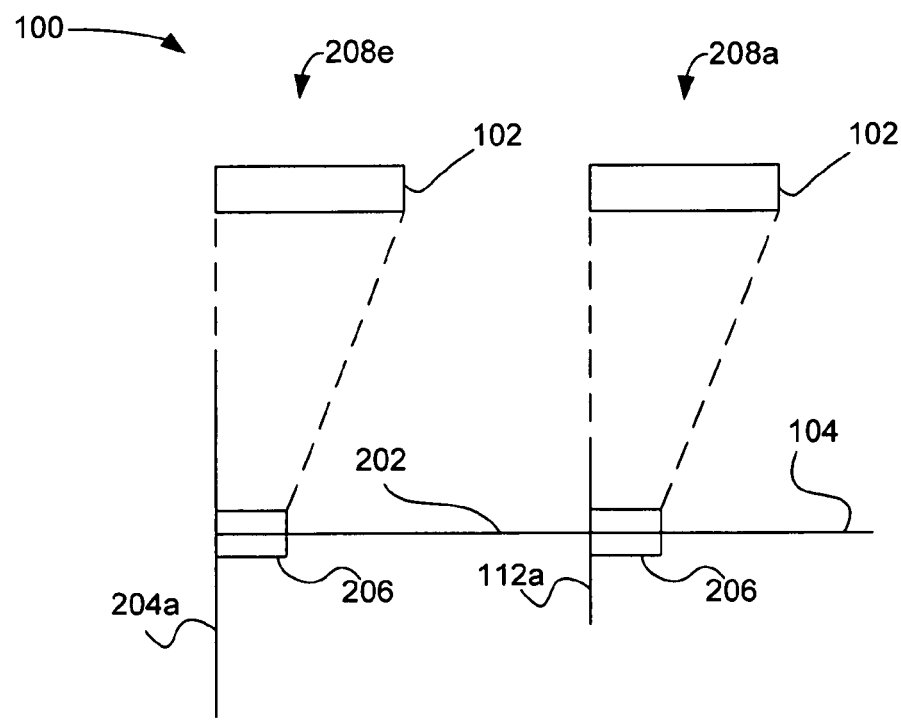

FIGS. 2B and 2C show different behaviors of the lens 102 when the lens 102 moves outside the edges 112 of the document 104. Either of the behaviors shown in FIG. 2B or 2C may be optionally used. Additionally, other behaviors may be implemented when desired. In FIG. 2B, the lens 102 maintains the same parallax compensation as when the lens 102 is within the document 104. In FIG. 2C, when the edges 112 are out of view of the lens 102, the edges of the window 100 (or a display) are substituted when calculating the compensation.

As shown in FIG. 2B, the entire window 100 may be visible within the lens 102, but the lens 102 may not reach the edge of the window 100. A view 208d shows that the portion 206 has moved further to the left relative to the lens 102 in response to the lens 102 moving to the left.

In FIG. 2C, the lens 102 has been reset so that the edge 114a of the window 100 becomes the edge from which the parallax compensation factor is calculated. According to an example, another parallax compensation factor may be calculated when the portion 206 leaves the document 104 (i.e. the region). A view 208e shows that both the lens 102 and the portion 206 are at the edge 114a of the window 100. In the second case, the lens 102 may be alternatively reset to the edge 114a when the edge 112a moves outside of the viewing area 106 of the lens 102.

As discussed regarding FIG. 1C, the parallax compensation may be performed in two dimensions. Here, FIG. 2D illustrates a three-dimensional view of the lens 102 relative to the portion 206 to illustrate two-dimensional compensation. As shown, the edge 112b and the edge 112c are continuous through the lens 102. The lens 102 is approximately in the position shown in FIG. 1C.

The corner defined by the edges 112b and 112c can be seen both in the "original" unmagnified view and in the magnified view shown in the lens 102. If viewed in the perspective shown in FIG. 2A, the view shown in FIG. 2D would correspond to the view 208c if the view shown in FIG. 2A is displayed as though a user is looking toward the top of the document 104 in the vertical direction, and also to the view 208c if displayed as though a user is looking toward the right in the horizontal direction.

Process for Performing Parallax Compensation

Figure 3:
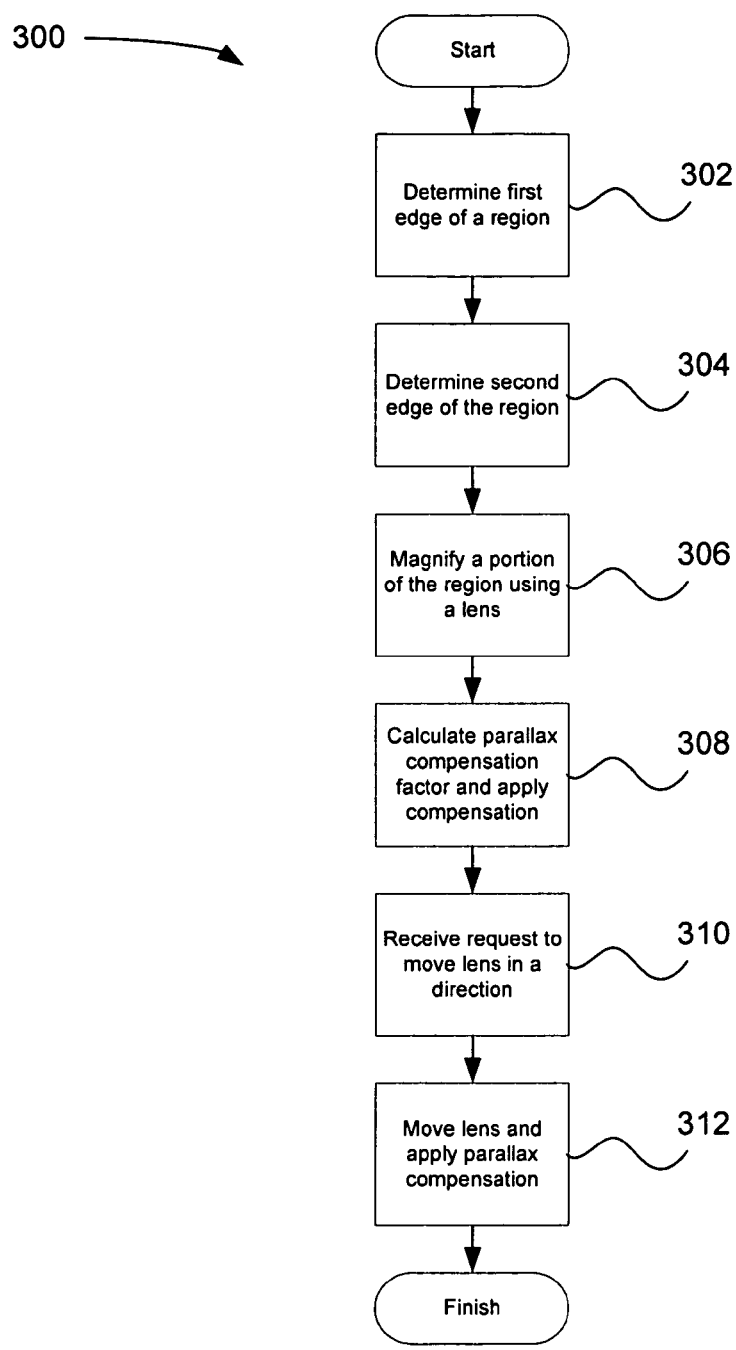
FIG. 3 is a flowchart describing a process for performing parallax compensation according to various examples.

FIG. 3 is a flowchart describing a process 300 for performing parallax compensation according to various examples. In some examples, the process 300 generally describes implementing a lens in such a way that parallax is compensated for so that edges appear continuous through the lens. For example, straight edge (such as the edges 112) may appear straight through the lens 102 when the lens employs parallax compensation as described herein. The two edges may be determined so that the compensation between the two edges may be calculated. According to the example, the first edge may be parallel (or approximately parallel) to the second edge.

In operation 302, a first edge of a region is determined. The first edge may be, for example, the left edge 112a of the document 104. In operation 304, a second edge of the region is determined. The second edge may be, for example, the right edge 112b of the document 104.

In operation 306, a portion of the region is magnified using a lens. The portion may be, for example, the portion 206 shown in FIGS. 2A-2D. The portion of the region is the area that is magnified within the lens (such as the lens 102). The lens may be presented over the region (e.g., the document), and may include a viewing area to display the magnified portion, as well as other controls (e.g., the slider 108a and the button 108b).

In operation 308, a parallax compensation factor is calculated. The compensation may be calculated by determining the position of the magnified portion relative to the lens at the first edge (see, e.g., the view 208a), and then determining the position of the magnified portion relative to the lens at the second edge (e.g., the view 208b). Intermediate positions between the edges may then be calculated so that as the lens moves between the edges, the position of the magnified portion moves in the same direction as the lens is moving, but at a faster rate (e.g., the portion moves in the direction relative to the lens). For example, the equations (1) and (2), above, may be used to determine a parallax compensation factor, and accordingly the amount of movement of a magnified portion relative to a lens. The parallax compensation may also be applied to the lens 102 by adjusting the portion relative to the lens using the parallax compensation factor.

In operation 310, a request to move the lens in a direction (e.g., left, right, diagonally) is received. The request may be a user selecting the lens 102 and dragging the lens (e.g., "click and drag"), or may be the result of another process or program. In operation 312, in response to receiving the request, the lens is moved, and the parallax compensation is applied. The parallax compensation may be applied by moving the portion of the region being magnified in the direction (i.e., the same direction the lens is moving) relative to the lens by an amount based on the parallax compensation factor determined in operation 308. In other words, the portion moves in the same direction as the lens, but at a faster rate. The movement of the portion being magnified relative to the lens provides the parallax correction so that the edges appear continuous through the lens.

An Exemplary Computer System

Figure 4:
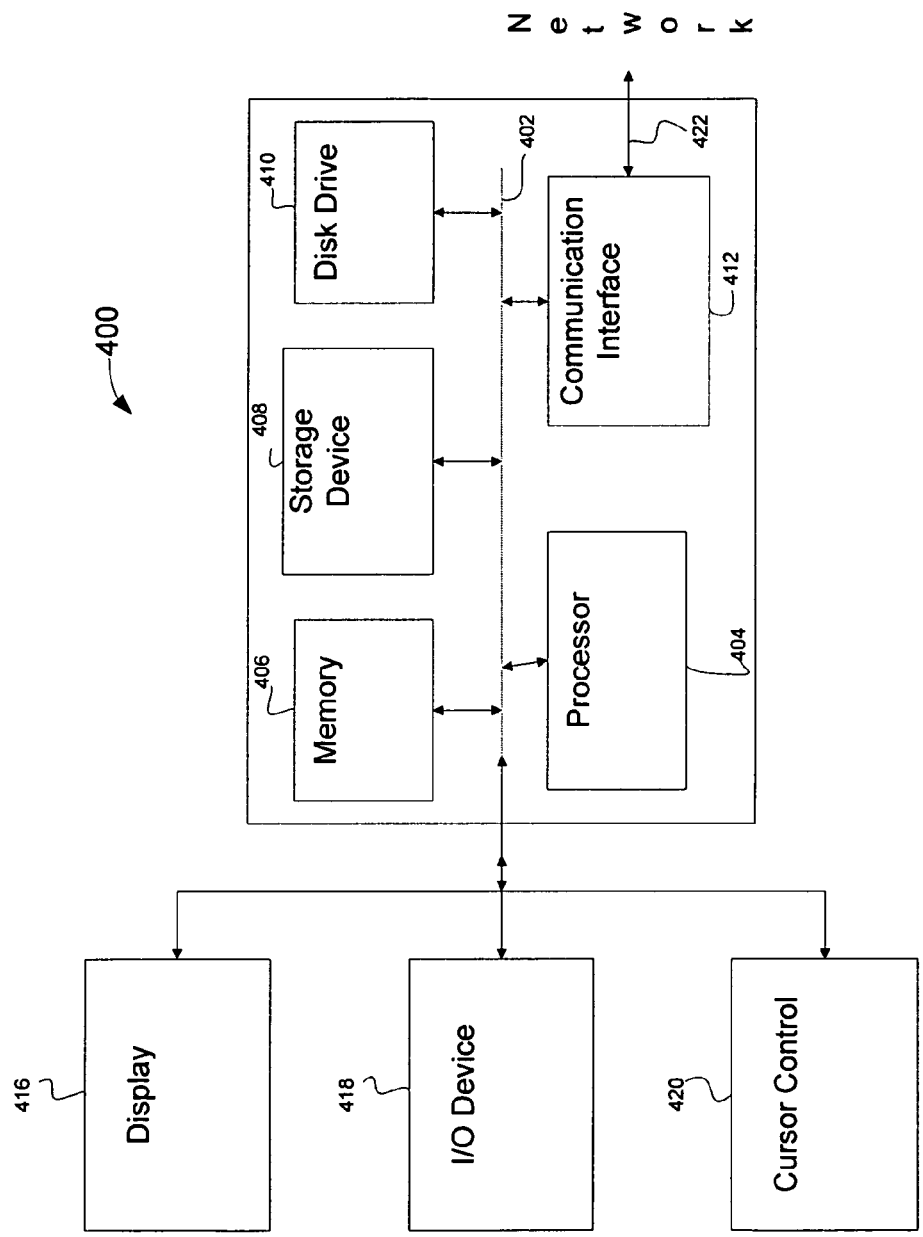
FIG. 4 is a block diagram illustrating an exemplary computer system suitable for implementing a lens using parallax compensation, in accordance with various examples.

FIG. 4 is a block diagram illustrating an exemplary computer system suitable for implementing a lens using parallax compensation, in accordance with various examples. In some examples, a computer system 400 may be used to implement computer programs, applications, methods, processes, or other software to perform the above-described techniques. The computer system 400 includes a bus 402 or other communication mechanism for communicating information, which interconnects subsystems and devices, such as a processor 404, a system memory 406 (e.g., RAM), a storage device 408 (e.g., ROM), a disk drive 410 (e.g., magnetic or optical), a communication interface 412 (e.g., modem or Ethernet card), a display 414 (e.g., CRT or LCD), an input device 416 (e.g., keyboard), and a cursor control 418 (e.g., mouse or trackball).

According to some examples, the computer system 400 performs specific operations by processor 404 executing one or more sequences of one or more instructions stored in the system memory 406. Such instructions may be read into the system memory 406 from another computer readable medium, such as the static storage device 408 or the disk drive 410. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed:

1. A method, comprising:
performing by a computer:
moving a magnifying lens across a computer display, and during said moving:
presenting within the magnifying lens a magnified image of a portion of the computer display currently within a focal area of the magnifying lens;
shifting the focal area of the magnifying lens relative to the magnifying lens to compensate for parallax in regard to a magnified view and an unmagnified view;
controlling said shifting to preserve visual continuity of one or more edges of a region on the computer display so that a portion of the one or more edges showing in the magnified image appears in continuous alignment, during said moving, with a corresponding unmagnified portion of the one or more edges showing outside the magnifying lens.

2. The method of claim 1,
wherein said shifting the focal area of the magnifying lens relative to the magnifying lens is proportional to a distance traversed by the magnifying lens across the computer display during said moving.

3. The method of claim 2, wherein during said moving the magnifying lens across the computer display:
at least part of a region of the computer display bounded by a first edge and by a second edge is magnified within the magnifying lens; and
said shifting the focal area of the magnifying lens to compensate for parallax shifts the focal area of the magnifying lens by a first amount, relative to the magnifying lens, while the magnifying lens moves by a second amount, relative to the computer display, wherein the first amount depends on the second amount, and the first amount is calculated based on:
  determining a first sum by subtracting a first dimension of the focal area of the magnifying lens from a second dimension of the magnifying lens;
  determining a second sum by subtracting the second dimension of the magnifying lens from a distance between the first edge of the region and the second edge of the region;
  determining a ratio by dividing the first sum by the second sum; and
  determining the first amount as the product of the ratio and the second amount.

4. The method of claim 3, wherein the second edge of the region is parallel to the first edge of the region.

5. The method of claim 4, further comprising:
  determining a third edge of the region that is perpendicular to the first edge of the region and to the second edge of the region; and
  determining a fourth edge of the region that is perpendicular to the first edge of the region and to the second edge of the region.

6. The method of claim 3, wherein the first edge of the region is the first edge of a document, and wherein the second edge of the region is the second edge of the document.

7. The method of claim 1, wherein said shifting moves the focal area of the magnifying lens relative to the magnifying lens in two dimensions.

8. The method of claim 2, wherein, while the focal area of the lens is at least partially outside a region of the computer display, said shifting the focal area of the magnifying lens relative to the magnifying lens depends on spatial relationships involving elements of the computer display that are outside of the region.

9. A method, comprising:
  performing by a computer:
  determining a first edge of a region and a second edge of a region, wherein determining the first edge and the second edge comprises determining the first edge of a document and the second edge of a document, the first edge is parallel to the second edge;
  magnifying a portion of the region using a lens;
  calculating a parallax compensation factor depending on a first position of the first edge, a second position of the second edge, a size of the lens and a size of the region; and
  moving the portion relative to the lens based on the parallax compensation factor.

10. The method of claim 9, wherein calculating the parallax compensation factor comprises:
  determining a first sum by subtracting a first dimension of the portion from a second dimension of the lens;
  determining a second sum by subtracting the second dimension of the lens from a distance between the first edge and the second edge;
  determining a ratio by dividing the first sum by the second sum; and
  determining the parallax compensation factor by multiplying the ratio by the second amount.

11. The method of claim 10, further comprising:
  determining a third edge perpendicular to the first edge and the second edge; and
  determining a fourth edge perpendicular to the first edge and the second edge.

12. The method of claim 11, further comprising:
  calculating the parallax compensation factor in two dimensions; and
  moving the portion relative to the lens in two dimensions based on the parallax compensation factor.

13. The method of claim 9, further comprising:
  receiving a request to move the lens in a direction; and
  moving the portion relative to the lens in the direction based on the parallax compensation factor.

14. The method of claim 9, wherein determining the first edge and the second edge comprises determining the first edge and the second edge based on metadata of the document.

15. A system, comprising:
  a processor; and
  a memory coupled to the processor, wherein the memory stores program instructions executable by the processor to perform:
  moving a magnifying lens across a computer display, and during said moving:
  presenting within the magnifying lens a magnified image of a portion of the computer display currently within a focal area of the magnifying lens;
  shifting the focal area of the magnifying lens relative to the magnifying lens to compensate for parallax in regard to a magnified view and an unmagnified view; and
  controlling said shifting to preserve visual continuity of one or more edges of a region on the computer display so that a portion of the one or more edges showing in the magnified image appears in continuous alignment, during said moving, with a corresponding unmagnified portion of the one or more edges showing outside the magnifying lens.

16. The system of claim 15, wherein said shifting the focal area of the magnifying lens relative to the magnifying lens is proportional to a distance traversed by the magnifying lens across the computer display during said moving.

17. The system of claim 16, wherein during said moving the magnifying lens across the computer display:
  at least part of a region of the computer display bounded by a first edge and by a second edge is magnified within the magnifying lens; and
  said shifting the focal area of the magnifying lens to compensate for shifts the focal area of the magnifying lens by a first amount, relative to the magnifying lens, while the magnifying lens moves by a second amount, relative to the computer display, wherein the first amount depends on the second amount, and the first amount is calculated based on:
  determining a first sum by subtracting a first dimension of the focal area of the magnifying lens from a second dimension of the magnifying lens;
  determining a second sum by subtracting the second dimension of the magnifying lens from a distance between the first edge of the region and the second edge of the region;
  determining a ratio by dividing the first sum by the second sum; and
  determining the first amount as the product of the ratio and the second amount.

18. The system of claim 17, wherein the second edge of the region is parallel to the first edge of the region.

19. A computer program product embodied in a non-transitory computer readable medium and comprising computer instructions for:
  moving a magnifying lens across a computer display, and during said moving:
  presenting within the magnifying lens a magnified image of a portion of the computer display currently within a focal area of the magnifying lens;

shifting the focal area of the magnifying lens relative to the magnifying lens to compensate for parallax in regard to a magnified view and an unmagnified view; and controlling said shifting to preserve visual continuity of one or more edges of a region on the computer display so that a portion of the one or more edges showing in the magnified image appears in continuous alignment, during said moving, with a corresponding unmagnified portion of the one or more edges showing outside the magnifying lens.

20. The computer program product of claim 19, wherein said shifting the focal area of the magnifying lens relative to the magnifying lens is proportional to a distance traversed by the magnifying lens across the computer display during said moving.

21. The computer program product of claim 20, wherein during said moving the magnifying lens across the computer display:

at least part of a region of the computer display bounded by a first edge and by a second edge is magnified within the magnifying lens; and said shifting the focal area of the magnifying lens to compensate for parallax shifts the focal area of the magnifying lens by a first amount, relative to the magnifying lens, while the magnifying lens moves by a second amount, relative to the computer display, wherein the first amount depends on the second amount, and the first amount is calculated based on:

determining a first sum by subtracting a first dimension of the focal area of the magnifying lens from a second dimension of the magnifying lens;

determining a second sum by subtracting the second dimension of the magnifying lens from a distance between the first edge of the region and the second edge of the region;

determining a ratio by dividing the first sum by the second sum; and determining the first amount as the product of the ratio and the second amount.

22. The computer program product of claim 21, the second edge of the region is parallel to the first edge of the region.

* * * * *